No. 812,902. PATENTED FEB. 20, 1906.
F. B. TOWNSEND.
FRICTION DRAFT RIGGING FOR RAILWAY CARS.
APPLICATION FILED OCT. 28, 1904.
2 SHEETS—SHEET 2.
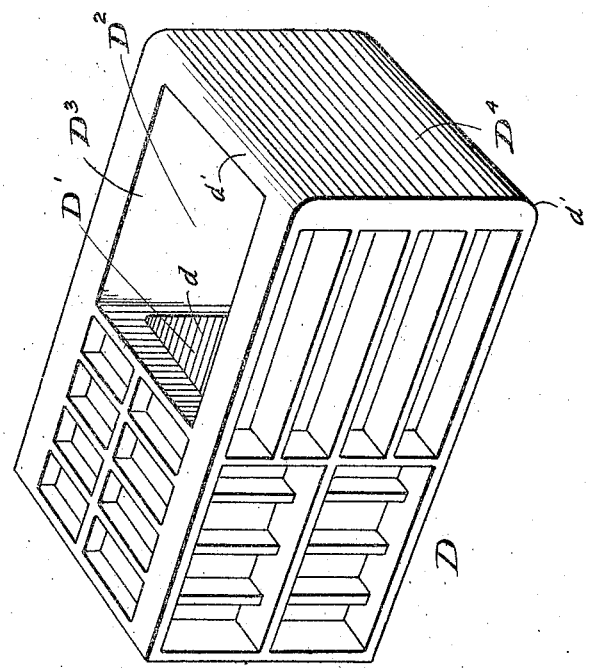
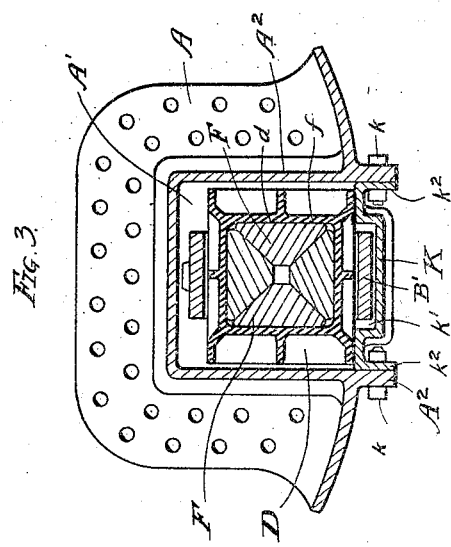
WITNESSES:
INVENTOR.
Frederick B. Townsend
BY
his ATTORNEYS

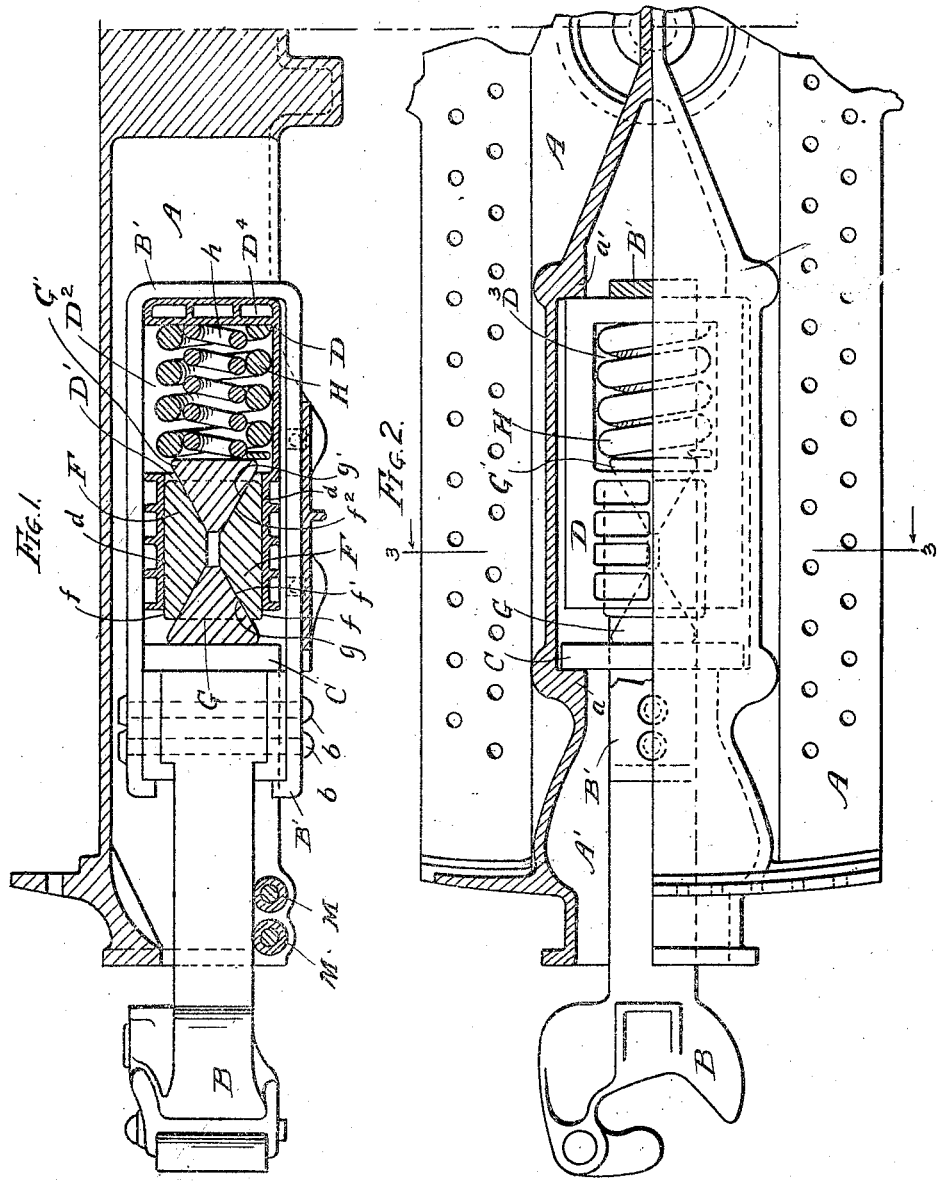

UNITED STATES PATENT OFFICE.

FREDERICK B. TOWNSEND, OF CHICAGO, ILLINOIS, ASSIGNOR TO W. H. MINER COMPANY, OF CHICAGO, ILLINOIS, A CORPORA- OF ILLINOIS.

FRICTION DRAFT-RIGGING FOR RAILWAY-CARS.

No. 812,902.　　　　　Specification of Letters Patent.　　　Patented Feb. 20, 1906.

Application filed October 28, 1904. Serial No. 230,315.

*To all whom it may concern:*

Be it known that I, FREDERICK B. TOWNSEND, a citizen of the United States, residing in Chicago, in the county of Cook and State of Illinois, have invented a new and useful Improvement in Friction Draft-Rigging for Railway-Cars, of which the following is a specification.

My invention relates to improvements in friction draft-rigging for railway-cars.

The object of my invention is to provide a friction draft-rigging of a strong, simple, efficient, and durable construction in which an exceptionally strong spring of large diameter may be employed and in which at the same time the friction-shell and friction devices need not be increased in size or caused to occupy an undue space—in other words, to provide a draft-rigging in which a spring may be employed of larger diameter than the shell or casing containing the friction-blocks.

A further object is to provide a friction draft-rigging of a simple, efficient, and durable construction in which the side plates or stop-castings are integral with the car-frame.

My invention consists in the means I employ to practically accomplish these objects or results—that is to say, it consists, in connection with the draw-bar and draw-bar extension or yoke, of a sliding friction shell or casing having an interior friction-surface, a plurality of friction-blocks having interior friction-faces in sliding frictional engagement with the friction shell or casing, one or more wedges for spreading the sliding friction-blocks, a spring, said friction shell or casing having a spring-chamber of larger size or diameter than the portion of the friction-shell which embraces the friction-blocks, and an opening preferably through the top of the shell or casing for the insertion and removal of the spring. By this means a spring of larger diameter than the portion of the friction-shell which surrounds the friction-blocks may be employed, and the draft-rigging is also adapted without change for use of springs of any size or diameter desired.

My invention further consists in the novel construction of parts and devices and novel combinations of parts and devices herein shown or described.

In the accompanying drawings, forming a part of this specification, Figure 1 is a central vertical longitudinal section of a friction draft-rigging embodying my invention. Fig. 2 is a plan view, partly in horizontal section. Fig. 3 is a cross-section on line 3 3 of Fig. 2. Fig. 4 is a detail perspective view of the sliding friction shell or casing.

In the drawings I have illustrated my invention as applied to a tank-car in which the tank itself substantially constitutes the frame of the car; but my invention may be applied to other than tank-cars.

In the drawings, A represents the part of the car-frame to which my invention is directly applied.

B is the car-coupler; B', the draw-bar extension or yoke, secured to the draw-bar by bolts or rivets $b$.

C is a follower, and D is the sliding friction shell or casing, the same being preferably of rectangular form in cross-section.

The car-frame A is provided with integral front and rear stops $a\ a'$, against one of which the follower C abuts and against the other of which one end of the sliding friction shell or casing D abuts, this shell or casing serving also as a follower.

The friction shell or casing D has a friction-chamber D' to receive the friction blocks or devices and a spring-chamber $D^2$, of larger size or diameter than its friction-chamber, to receive the spring, which may thus be of larger size than could be inserted through the friction-chamber of the shell. The friction shell or casing D has interior friction-faces $d$, which are frictionally engaged by the exterior friction-faces $f$ of the sliding friction-blocks F, which are preferably four in number. The friction-blocks F have inclined or wedging faces $f'\ f^2$, which are engaged by the inclined or wedging faces $g\ g'$ of the wedges G G'. The friction shell or casing D is provided with a chamber $D^2$ to receive the spring H, this chamber being of larger size or diameter than that portion of the shell D which surrounds and frictionally engages the friction-blocks F, so that when desired a spring of larger size or diameter may be employed than it would be possible to insert through the friction end of the shell or casing D. To enable a spring H of larger size than the friction portion of the shell D to be inserted in the shell, said shell is provided with a spring-inserting opening $D^3$, preferably in its upper side, through which a large spring H may be inserted. One or more smaller springs $h$ are preferably nested within the large spring H. The spring H abuts at one end against the wedge G′ and at its opposite end against the closed end D⁴ of the shell or casing D. The shell or casing D is preferably provided with rounded corners $d'$ to fit the strap or yoke B′, which embraces the shell D.

The frame A is provided with a longitudinal recess or chamber A′ to receive the draft-rigging, and to the integral walls A² of which the draw-bar guide or spring-plate K, which supports and guides the draft-rigging, is removably secured by bolts $k$. The draw-bar guide or spring-plate K is provided with a longitudinal recess or channel $k'$ to receive the lower member of the pocket-strap or draw-bar extension B′, and thus forms a guide for the same. The draw-bar guide-plate K is provided with flanges $k^2$, through which the bolts $k$ extend.

M M are rollers serving as a carry-iron to support the outer end of the draw-bar.

I claim—

1. In a friction draft-rigging, the combination with a draw-bar and a draw-bar strap or yoke, of a sliding friction shell or casing having a friction-chamber and interior friction-faces parallel with the draw-bar, and a spring-chamber of larger size or diameter than the friction-chamber, sliding friction-blocks within the friction-chamber of said shell or casing having exterior friction-faces parallel to and in sliding frictional engagement with said interior friction-faces of said shell or casing, a wedge or device for spreading said blocks and a spring in the spring-chamber of said shell or casing, said friction shell or chamber having an opening in one of its sides for insertion and removal of the spring, the walls of said friction-chamber being thicker and stronger than the walls of said spring-chamber, substantially as specified.

2. In a friction draft-rigging, the combination with a draw-bar and a draw-bar strap or yoke, of a sliding friction shell or casing having a friction-chamber and interior friction-faces parallel with the draw-bar, and a spring-chamber of larger size or diameter than the friction-chamber, sliding friction-blocks within the friction-chamber of said shell or casing having exterior friction-faces parallel to and in sliding frictional engagement with said interior friction-faces of said shell or casing, a wedge or device for spreading said blocks and a spring in the spring-chamber of said shell or casing, said spring being of larger size or diameter than the friction-chamber, said friction shell or casing having an opening in one of its sides for insertion and removal of the spring, the walls of said friction-chamber being thicker and stronger than the walls of said spring-chamber, substantially as specified.

3. In a friction draft-rigging, the combination with a car-frame furnished with front and rear stops, of a draw-bar and draw-bar yoke or extension, a follower abutting against one of said stops on the car-frame, a sliding friction shell or casing abutting at one end against the other stop on the car-frame, and having a friction-chamber, and a spring-chamber of larger size than the friction-chamber, said sliding friction-shell having interior friction-faces parallel to the draw-bar, and said friction-blocks having exterior friction-faces parallel to and in frictional engagement with said interior friction-faces of said friction shell or casing, sliding friction-blocks in said friction-chamber, a wedge for spreading said blocks and a spring, said friction shell or casing having a lateral opening for insertion and removal of the spring, the walls of said friction-chamber being thicker and stronger than the walls of said spring-chamber, substantially as specified.

4. In a friction draft-rigging, the combination with a car-frame furnished with front and rear stops, of a draw-bar and draw-bar yoke or extension, a follower abutting against one of said stops on the car-frame, a sliding friction shell or casing abutting at one end against the other stop on the car-frame, and having a friction-chamber, and a spring-chamber of larger size than the friction-chamber, sliding friction-blocks in said friction-chamber, said sliding friction-shell having interior friction-faces parallel to the draw-bar, and said friction-blocks having exterior friction-faces parallel to and in frictional engagement with said interior friction-faces of said friction shell or casing, a pair of wedges for spreading said blocks and a spring, said sliding friction shell or casing having a lateral opening through one of its sides for insertion and removal of the spring, the walls of said friction-chamber being thicker and stronger than the walls of said spring-chamber, substantially as specified.

5. In a friction draft-rigging, the combination with a draw-bar and a draw-bar strap or yoke, of a sliding friction shell or casing having a friction-chamber and a spring-chamber and furnished with a lateral opening into the spring-chamber for insertion and removal of the spring, sliding friction-blocks in the friction-chamber, said sliding friction-shell having interior friction-faces parallel to the draw-bar, and said friction-blocks having exterior friction-faces parallel to and in frictional engagement with said interior friction-faces of said friction shell or casing, and a spring in the spring-chamber, the walls of said friction-chamber being thicker and stronger than the walls of said spring-chamber, substantially as specified.

FREDERICK B. TOWNSEND.

Witnesses:
EDMUND ADCOCK,
H. M. MUNDAY.